United States Patent

Holsinger

[15] 3,641,460

[45] Feb. 8, 1972

[54] FREQUENCY SHIFT TRANSMITTER

[72] Inventor: Jerry L. Holsinger, Lexington, Mass.

[73] Assignee: Intertel, Inc., Burlington, Mass.

[22] Filed: Nov. 9, 1970

[21] Appl. No.: 87,706

[52] U.S. Cl. ...............................................331/110, 331/141

[51] Int. Cl. ...............................................................H03b 5/26

[58] Field of Search ...............................331/110, 135–141; 330/107; 333/80 T, 70 R

[56] References Cited

UNITED STATES PATENTS

| | | | |
|---|---|---|---|
| 2,820,903 | 1/1958 | Roulston et al. | 331/141 |
| 2,983,880 | 5/1961 | McFadden | 331/136 |
| 3,257,611 | 6/1966 | McKim | 331/141 |
| 3,378,785 | 4/1968 | Nordahl | 330/107 |
| 3,396,346 | 8/1968 | Richman | 331/135 |
| 3,482,188 | 12/1969 | Crouse | 331/135 |

*Primary Examiner*—John Kominski
*Attorney*—Cesari and McKenna

[57] ABSTRACT

A frequency shift keying oscillator comprising filter circuits and a positive feedback circuit. First resistors and reactance elements in each filter determine the natural frequency of the oscillator. Keying signals selectively switch second resistors in parallel with the first resistors to change the natural frequency. The percentage resistance variations produced by the keying signals are substantially equal. This equalizes the steady-state gains of the oscillator in its two modes so that no amplitude discontinuities occur in the output signal as the oscillator switches from one mode to the other. As the reactor in each filter is a constant value element, no phase discontinuities occur. Hence, the output signal is a continuous, fundamental sinusoidal signal which has two mutually exclusive frequencies.

4 Claims, 3 Drawing Figures

Inventor
Jerry L. Holsinger

By Cesari and McKenna
Attorneys

Inventor
Jerry L. Holsinger

By Cesari and McKenna
Attorneys

FREQUENCY SHIFT TRANSMITTER

BACKGROUND OF THE INVENTION

This invention generally relates to oscillators, more specifically to oscillators using filter circuits for frequency shift keying applications.

There are several systems and methods for transferring data between two remote locations. With frequency shift keying systems, a modulator switches a carrier between two or more discrete frequencies in response to data signals in binary form. Any two frequencies can be used for the carrier. Closely related frequencies in the audio spectrum are generally used when the telephone system serves as the transmission medium. Also, a frequency-shift subcarrier in the audio band may be used to modulate a radio frequency carrier. The present invention is particularly directed to systems using such low-frequency carriers or subcarriers.

When a data source feeds data to a frequency-shift keying transmitter, control and oscillator circuits in the transmitter produce the proper sequence of frequency-shifted signals. The timing of shifts between the two frequencies depends on the timing of the data signals; thus, it is generally unrelated to the phase of the carrier.

The audio signal sequences can be produced by two more oscillator circuits in conjunction with a circuit for generating keying signals for each character. In one arrangement, two oscillators independently and continuously generate the two audio signals. The keying circuit selectively and alternately switches the output from each oscillator into a transmitter. In another arrangement, a single oscillator energizes frequency multipliers, dividers, or both to produce the two frequencies. The keying circuit again couples one or the other audio signal to the transmitter. In still another arrangement, the keying circuit turns two oscillators on and off in a mutually exclusive fashion. Both oscillators are directly connected to the transmitter. Other systems use a keying circuit which controls and changes frequency determining parameters to shift an oscillator output between two frequencies.

In these prior systems, phase and amplitude discontinuities exist as the keying circuit shifts the oscillator or related circuits from one frequency to another. These discontinuities produce transients which appear in the transmitter output. Transients can be tolerated in systems where relatively slow transfer rates exist (i.e., each keying circuit change occurs after several cycles of the carrier). In data processing and other systems, however, data transfer rates of 1,800 baud are desirable. At these rates, each keying circuit change can occur after a fraction of a cycle. Under these conditions, the transients can exceed the time the keying circuit produces one or the other of the two keying signals. As a result, prior systems incorporate rather complex signal conditioning circuits for reducing the transients in the output signal to acceptable levels to assure that the systems transfer the data accurately.

In certain prior systems, the oscillator circuit shifts between two very high frequencies. For example, an oscillator circuit might shift between a 20.0 kHz. frequency and a 21.0 kHz. frequency. After the resulting switching transients are filtered, the high frequency signal is converted to an audio signal. In another approach, a high-frequency crystal oscillator generating for example, a 1 mHz. center frequency signal shifts between two frequencies. A digital dividing network converts these high-frequency signals to audiofrequency square wave outputs which must be converted to a sinusoidal output signal. Both systems rely on the higher oscillator frequency to permit increased data transfer rates. However, they require expensive and complex filtering and frequency conversion circuits to obtain a fundamental sinusoidal signal at the desired transmission frequencies.

In another system, one of two sources of different voltages energizes the capacitors in the resistive-capacitor timing circuit for a free-running multivibrator in response to keying signals. When the higher voltage energizes the multivibrator, it operates at a higher frequency. This system does reduce switching transients because no phase shifts occur. However, the multivibrator produces a square wave signal, so significant filtering circuits are necessary to obtain sinusoidal output signals.

Therefore, it is an object of this invention to provide a frequency shift keying oscillator which provides sinusoidal output signals.

Another object of this invention is to provide a frequency shift keying oscillator which is capable of providing sinusoidal output signals without filtering.

It is another object of this invention to provide a simplified frequency shift keying oscillator which is capable of transmitting data at increased rates.

SUMMARY

I have found that transients can be eliminated in a frequency-shift keying oscillator of the resistance-reactance type. The oscillator includes high- and low-pass filters and a positive feedback circuit. The oscillation frequency is determined by the resistive and reactive elements in the filters. Frequency shifts are obtained by changing the values of resistances in the filters. Changes in the resistances do not directly cause instantaneous changes in any of the voltages around the oscillator loop and, if the changes are correctly proportioned, they do not change the loop gain. Accordingly, there are no discontinuities in the output voltage, with a consequent elimination of transients.

This invention is pointed out with particularity in the appended claims. A more thorough understanding of above and further objects and advantages of this invention may be attained by referring to the following detailed description taken in conjunction with the accompanying drawings.

DESCRIPTION OF ILLUSTRATIVE EMBODIMENTS

Figure 1:
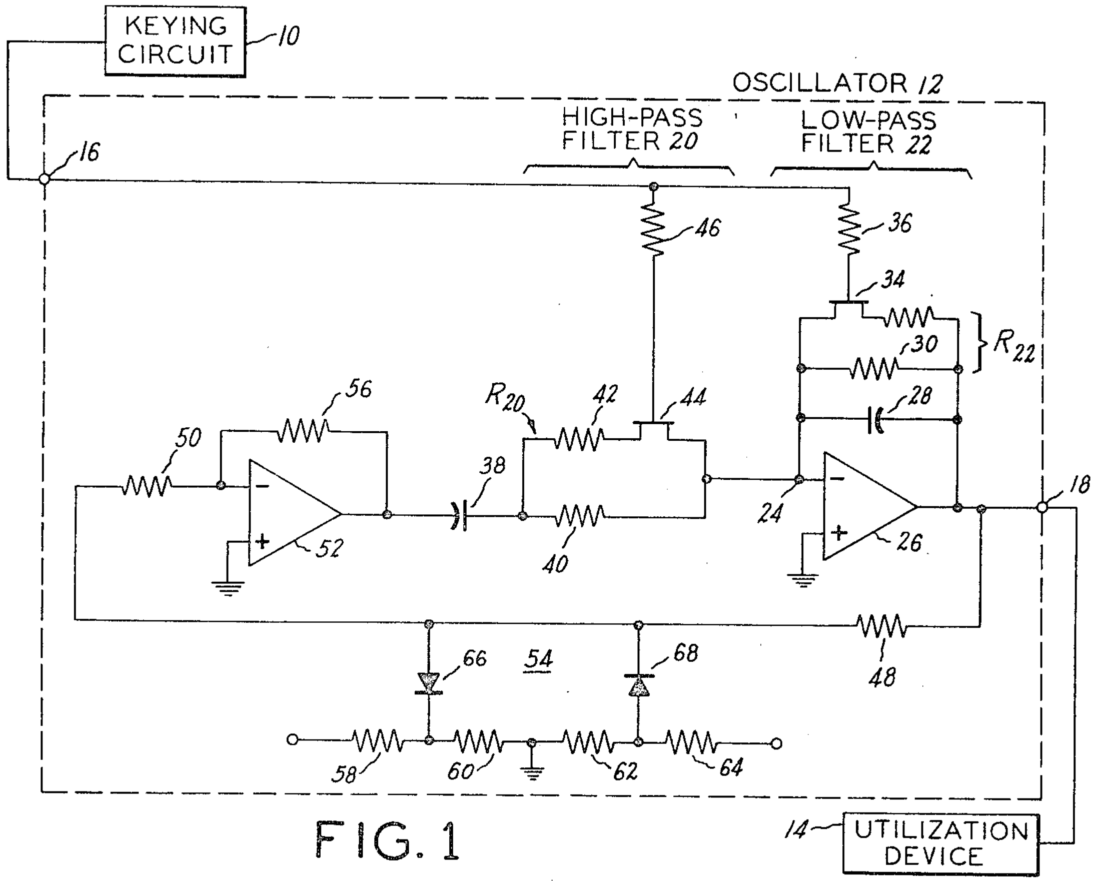
FIG. 1 is a schematic of one embodiment of a frequency-shift keying circuit incorporating this invention.

As shown in FIG. 1, a frequency-shift keying data transmission system comprises a keying circuit 10, an oscillator 12 and a utilization device 14. The keying circuit 10 generates signal sequences which alternate between two distinct levels in response to digital information, control signals for radio telegraphy or other data signals. When the keying circuit 10 energizes an input terminal 16 with these control or keying signals, the frequency of the output signal at a terminal 18 shifts between two values in accordance with the keying signals.

The oscillator 12 comprises two filters 20 and 22 connected to an inverting input terminal 24 for an operational amplifier 26. The amplifier 26 energizes the utilization device 14 while the filter 22, which comprises a capacitor 28 and a resistance unit $R_{22}$, couples a portion of the output signal to the inverting input 24. This negative feedback signal varies with signal frequency in such a manner that the filter 22 is an active, low-pass filter.

The resistance unit $R_{22}$ comprises a resistor 30 and a parallel circuit comprising a resistor 32 and a field effect transistor (FET) 34 in series. Signals from the keying unit 10 energize the FET 34 through a resistor 36 so the value of the resistance element $R_{22}$ changes in response to keying signals.

The other filter 20 comprises a capacitor 38 and resistance unit $R_{20}$ including a resistor 40 and a parallel circuit including a resistor 42 and FET 44 in series. A resistor 46 couples the keying unit 10 and the FET 44. Therefore, the resistance unit 22 comprises the resistors 40 and 42 in parallel when the FET 44 conducts and only the resistor 40 when the FET 44 does not conduct. This filter 20 is a high-pass filter.

A portion of the output signals from the amplifier 26 are positively fed back to the capacitor 38. The feedback signals are produced by series resistors 48 and 50 and an amplifier 52. A limiting circuit 54 controls the magnitude of the feedback signal while the amplifier 52 inverts the signal to provide the positive feedback to the input of the high-pass filter 20. A resistor 56 provides negative feedback for the amplifier 52.

The limiting circuit 54 comprises a voltage divider including resistors 58, 60, 62 and 64 in series between a positive and negative potential source, and diodes 66 and 68. The junction of the resistors 60 and 62 is grounded. The diodes 66 and 68 are connected to the junctions of the resistors 58 and 60 and of the resistors 62 and 64, respectively. Both diodes are connected to the junction of the resistors 48 and 50 and poled to conduct when the voltage at the terminal 34 exceeds a positive or negative maximum. For example, if the feedback voltage increases positively and tends to exceed the voltage at the junction of the resistors 58 and 60 plus the forward breakdown voltage of the diode 66, the diode 66 conducts and limits further increases.

Feedback circuit parameters are determined so the amplifiers 26 and 52 operate linearly. In addition, the individual amplifiers 26 and 52 are operated so the positive feedback assures oscillation.

Using a standard analysis for a transfer function, (see Mitra, *Analysis and Synthesis of Linear Active Networks*, John Wiley & Sons, Inc., New York, 1969) the transfer function for the oscillator unit 12 can be shown to have the following form where $R_{22}$ and $R_{20}$ represent fixed resistance values:

(1) $H(s)=kS/[(S^2/\omega_o^2)+(S/Q\omega_o)+1]$ where $k$ is a proportionality constant and is greater than $1/Q$, $\omega_o$ is the natural frequency for the circuit, and (2) $\omega_o^2=1/R_{22}C_{28}R_{20}C_{38}$, and (3) $1/Q\omega_o=R_{20}C_{38}+R_{22}C_{28}$ Equation (2) shows that the values of the resistance elements $R_{20}$ and $R_{22}$ and the capacitors 28 and 38 determine the natural frequency. Equation (3) shows that the $Q$ of the circuit can be modified by varying other parameters in the circuit independently of the natural frequency. I have found that the resistance elements $R_{20}$ and $R_{22}$ can be modified within certain constraints so that the output signal frequency shifts without any phase displacement or discontinuities. First, the capacitances of the capacitors 28 and 36 must remain constant. Secondly, the steady-state voltages across the capacitor 28 and the capacitor 38 must not change after the output signal frequency shifts.

The circuit shown in FIG. 1 satisfies both constraints. Only the resistance units $R_{22}$ and $R_{20}$ change values. The capacitors 28 and 38 have constant values. Further, the overall gain in the circuit assures that the steady-state voltages across each capacitor do not change appreciably by switching the resistance units $R_{20}$ and $R_{22}$ when the resistance values are changed by approximately the same percentage or per unit value; i.e., $\Delta R_{20}/R_{20}=\Delta R_{22}/R_{22}$ where $\Delta R_{20}$ and $\Delta R_{22}$ represent the resistance changes.

When the capacitors remain at the same value, the stored energy is constant during the switching time. As a result, no phase shifts occur. If the steady-state gains remain the same, both frequency signals have the same magnitude. Therefore, the output at the terminal 18 is a continuous first-order function when the keying circuit 10 changes the frequencies; no transients occur. Further, the oscillator 12 produces a fundamental sinusoidal signal, so no additional filter circuits are necessary for eliminating harmonics.

As a specific example, the oscillator 10 shown in FIG. 1 has been constructed with the following circuit parameters:

| | |
|---|---|
| **High-Pass Filter 20** | **Low-Pass Filter 22** |
| Amplifier 26=709 Op. Amp. | |
| Capacitor 38=0.01 μfd. | Capacitor 28=0.01 μfd. |
| Resistor 40=7.85 kΩ | Resistor 30=7.85 kΩ |
| Resistor 42=79.5 kΩ | Resistor 32=79.5 kΩ |
| **Feedback Circuit 28** | |
| Amplifier 52=709 Op. Amp. | Resistor 50=10 kΩ |
| Resistor 48=10 kΩ | Resistor 56=21 kΩ |
| Voltage at junction of resistors 58 and 60, 62 and 64 =+ 3, −3 | |

This specific oscillator alternately energizes the utilization device 14 with a 2,025 Hz. and a 2,225 Hz. signal as the keying circuit 10 disables and enables the FET's 40 and 50.

Figure 2:
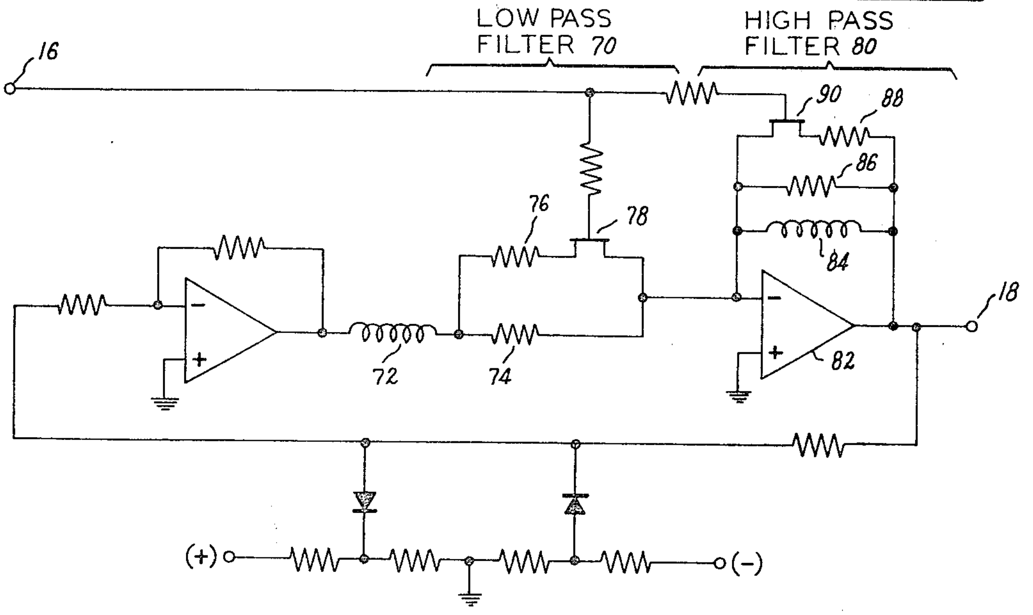
FIG. 2 is a schematic of another oscillator circuit adapted for use in the circuit shown in FIG. 1.

Normally, high- and low-pass filters comprise resistors and capacitors but they can also comprise resistors and inductors. FIG. 2 illustrates one embodiment of such a frequency-shift keying oscillator which uses inductors. Specifically, a low-pass filter 70 comprises an inductor 72 in series with a resistor 74. A resistor 76 and FET 78 are in parallel with the resistor 74. The FET 78 is resistively coupled to the terminal 16.

A high-pass active filter 80 constitutes a negative feedback loop around an operational amplifier 82 and comprises an inductor 84 and a resistor 86. Another resistor 88 is selectively switched in parallel with the resistor 86 by an FET 90 also coupled to the terminal 16. A feedback circuit 92, analogous to the feedback circuit in FIG. 1, connects the output of the amplifier 82 to the inductor 72 in the low-pass filter 70.

Again, it can be shown that the transfer function for this circuit has the form:

(4) $H(s)=kS/[(S^2/\omega_o^2)+(S/Q\omega_o)+1]$ where, (5) $k=L_{84}/R_{74}$ (6) $\omega_o^2=R_{74}R_{86}/L_{72}L_{84}$ (7) $1/Q\omega_o=(L_{72}/R_{74})+(L_{84}/R_{86})$ and the values of $R_{74}$ and $R_{86}$ represent the combined values of the resistors 74 and 76 and of the resistors 86 and 88 when the FET's 78 and 90 conduct.

Analogous criteria must be met to obtain a continuous output signal. That is, the stored energy in each inductor must remain constant during the switching interval, and the steady-state current value through each inductor must be the same for either frequency. When both conditions are met, the oscillator produces a continuous output signal. Switching does not introduce any phase shift or amplitude variations so a fundamental sinusoidal output signal is obtained without filtering.

Figure 3:
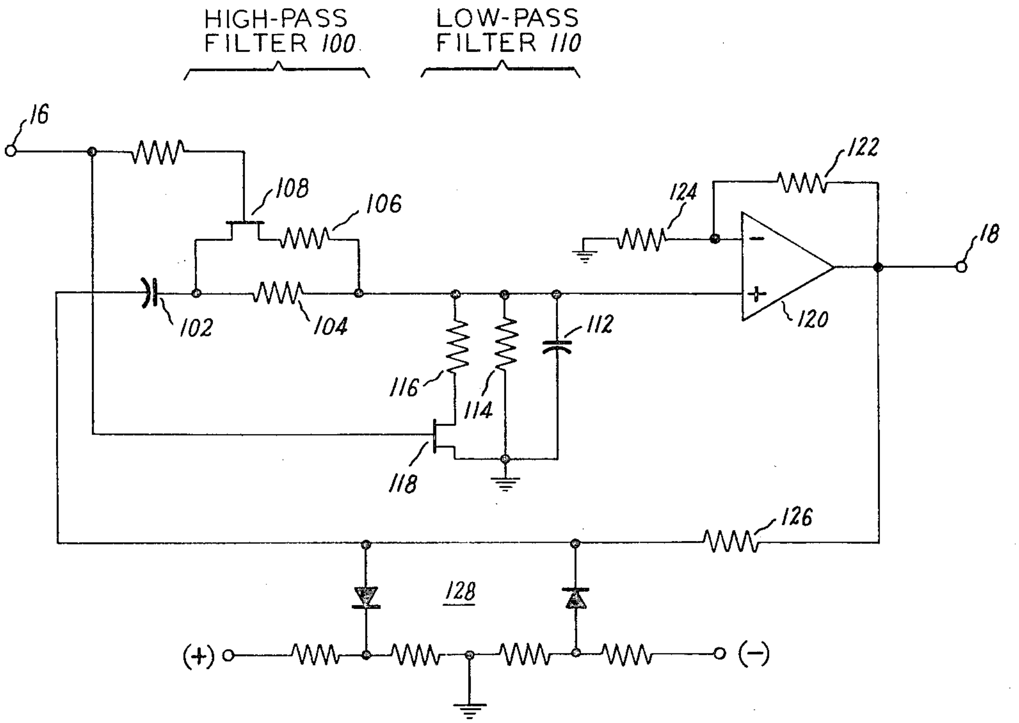
FIG. 3 is a schematic of yet another oscillator circuit adapted for use in the circuit shown in FIG. 1.

FIG. 1 illustrates an oscillator with two operational amplifiers. A preferred oscillator using RC filters and a single operational amplifier is shown in FIG. 3. A high-pass filter 100 comprises a capacitor 102 in series with the resistor 104. A resistor 106 and an FET 108 are in parallel with the resistor 104. The high-pass filter 100 energizes a low-pass filter 110 comprising a capacitor 112 and resistor 114 in parallel and connected between the output from the filter and ground. Another resistor 116 is coupled to ground by a FET 118. Both FET's 108 and 118 are resistively connected to the terminal 16.

The high-pass filter 100 also energizes the noninverting input of an operational amplifier 120. A voltage divider comprising a resistor 122 and a resistor 124 in series between the output terminal of the amplifier 120 and ground controls the amplifier gain. This signal voltage across the resistor 124 energizes the inverting input of the amplifier 120 and maintains a zero difference voltage across the amplifier inputs. A feedback circuit comprising a resistor 126 and a limiting circuit 128 connects the oscillator output terminal 16 and the capacitor 102. The amplifier 120 gain is selected to compensate losses in the two filters 100 and 110. The feedback circuit 126 limits the positive feedback so that the amplifier 120 operates linearly.

An analysis of this circuit again shows that the transfer function has the following format:

(8) $H(s)=kS/[(S^2/\omega_o^2)+(S/Q\omega_o)+1]$ where $k$ is a proportionality constant (9) $\omega_o^2=1/R_{100}R_{110}C_{102}C_{112}$ and

(10) $1/Q\omega_o=(R_{100}C_{102})+(R_{110}C_{112})+(R_{100}C_{102})$

Only the resistor values are changed by switching so the capacitance values are constant during the switching interval. Further, the per unit resistance variations are the same for both filters.

An amplifier, constructed in accordance with the schematic diagram shown in FIG. 3, had the following parameters:

| | |
|---|---|
| High-Pass Filter **100** | Low-Pass Filter **110** |
| Capacitor **102**=0.0033 μfd. | Capacitor **112**=0.01 μfd. |
| Resistor **104**=45.3 kΩ | Resistor **114**=15.1 15.1 |
| Resistor **106**=237 kΩ | Resistor **116**=80.6 kΩ |
| Amplifier Circuit **120** Model | **709** Operation Amplifier |
| Resistor **122**=6.34 kΩ | |
| Resistor **124**=1.0 kΩ | |
| Feedback resistor **126**=1.0 kΩ | |

When the circuit is energized, it alternately generates a 1,070 Hz. and a 1270 Hz. signal as the conduction of the FET's 100 and 108 alternately changes in response to keying signals.

In addition to being simpler and less expensive to construct, the oscillator shown in FIG. 3 should be more stable. All the frequency determining elements are external to the amplifier 120, so apparently amplifier variations caused by environmental and circuit variations have a reduced effect. Commercially available capacitors and resistors have stable thermal and electrical properties. As a result, the requirements for a satisfactory operational amplifier can be less stringent. This allows still further economies in manufacture.

In summary, high- and low-pass filters can be combined in an oscillator circuit. In accordance with my invention, I have found that the frequency of oscillation can be changed by modifying the resistance values of each filter simultaneously with several advantages. Primarily, the oscillator frequency shifts to a new value without any significant phase or amplitude discontinuities. Therefore, transients are substantially eliminated. Further, the oscillator generates a fundamental sinusoidal signal and obviates the need for complex and expensive filtering used in the prior oscillators.

These three specific embodiments are illustrative only. Others can be constructed and arranged to obtain a frequency shift keying oscillator with the same results. For example, the output signal is fed back to a low-pass filter in the circuit of FIG. 2 and to high-pass filters in the circuit of FIGS. 1 and 3. Therefore, the location and orientation of the various filters depends upon particular filter configurations which are included in the oscillator unit. The parameters may be selected so the oscillator generates a signal with frequencies outside the audio spectrum even though these specific examples describe oscillators for generating audio signals. Further, the resistance values may be changed by other means than the specifically described parallel resistors and FET's.

Therefore, it is the object of the appended claims to cover all such modifications and variations as come within the true spirit and scope of the invention.

What I claim as new and desire to secure by Letters Patent of the United States is:

1. An oscillator for mutually exclusively generating two frequency output signals in response to control signals, said oscillator comprising:

A. a first operational amplifier,

B. an active low-pass filter comprising a first resistance means and first capacitor in parallel connected between the output and inverting input of said amplifier, said first resistance means having first and second values, C. a high-pass filter comprising a second capacitor and a second resistance means in series with the inverting input of said first amplifier, D. a feedback circuit including a second operational amplifier for inverting signals from the output of said first amplifier and applying the feedback signals to said high-pass filter, said feedback circuit additionally including means for limiting the feedback signal to a value within the linear operating regions of said operational amplifiers, and E. means for switching said first and second resistance means between the first and second values simultaneously in response to control signals to thereby vary the oscillator output frequency without producing significant transients.

2. An oscillator circuit as recited in claim 1 wherein said first and second resistance means each comprise a first resistor and, in parallel therewith, switching means and a second resistor in series, said first and second resistor being paralleled in response to first control signals to thereby increase the natural frequency of said oscillator.

3. An oscillator for mutually exclusively generating first and second frequency signals in response to keying signals, said oscillator comprising:

A. a first operational amplifier,

B. a low-pass filter including a first inductor and a first resistance means in series with said first operational amplifier, said first resistance means having first and second values, C. a high-pass filter including a second inductor and a second resistance means in parallel and connected between the output and inverting input of said first amplifiers, said second resistance means having first and second values, D. a feedback circuit including a second operational amplifier for inverting signals from the output of said first amplifier and applying the feedback signals to said low-pass filter, said feedback circuit additionally including means for limiting the feedback signal to a value within the linear operating regions of said operational amplifiers, and E. means responsive to the control signals for simultaneously switching said first and second resistance means between their first and second values simultaneously in response to control signals to thereby vary the oscillator output frequency.

4. An oscillator as recited in claim 3 wherein each of said first and second resistance means comprises a first resistor and, in parallel therewith, switching means and a second resistor in series, said first and second resistors being paralleled in response to first control signals to thereby increase the natural frequency of said oscillator.

* * * * *